(12) United States Patent
Thorvaldsson et al.

(10) Patent No.: US 8,314,596 B2
(45) Date of Patent: Nov. 20, 2012

(54) POLY-PHASE REACTIVE POWER COMPENSATOR

(75) Inventors: Björn Thorvaldsson, Kolbäck (SE); Mikael Halonen, Västerås (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/225,925

(22) Filed: Sep. 6, 2011

(65) Prior Publication Data
US 2011/0316493 A1    Dec. 29, 2011

Related U.S. Application Data

(63) Continuation of application No. PCT/EP2009/052683, filed on Mar. 6, 2009.

(51) Int. Cl.
*G05F 1/70*    (2006.01)
(52) U.S. Cl. .................... 323/210; 323/209
(58) Field of Classification Search .......... 323/205, 323/207–210
See application file for complete search history.

(56) References Cited

U.S. PATENT DOCUMENTS

| | | | | |
|---|---|---|---|---|
| 4,019,124 A | * | 4/1977 | Moltgen | 323/207 |
| 5,627,454 A | * | 5/1997 | Aebischer et al. | 323/210 |
| 5,684,389 A | * | 11/1997 | Tyll et al. | 323/209 |
| 5,969,509 A | * | 10/1999 | Thorvaldsson | 323/210 |

FOREIGN PATENT DOCUMENTS

| | | |
|---|---|---|
| DE | 3308560 A1 | 9/1984 |
| GB | 479112 | 1/1938 |
| GB | 716973 | 10/1954 |

OTHER PUBLICATIONS

International Search Report; PCT/EP2009/052683; Dec. 9, 2009; 2 pages.
International Preliminary Report on Patentability and Written Opinion of the International Searching Authority; Application No. PCT/EP2009/052683; Issued: Sep. 6, 2011; 7 pages.

* cited by examiner

*Primary Examiner* — Matthew Nguyen
(74) *Attorney, Agent, or Firm* — St. Onge Steward Johnston & Reens LLC

(57) ABSTRACT

The invention relates to a poly-phase reactive power compensator 1 comprising for each phase a, b, c a reactive power means 3a, 3b, 3c; 2a, 2b, 2c. The poly-phase reactive power compensator 1 further comprises means 21, 22, 23; 31, 32, 33 for transferring susceptance between the phases a, b, c. The invention also provides a control device for controlling the poly-phase reactive power compensator 1.

6 Claims, 2 Drawing Sheets

POLY-PHASE REACTIVE POWER COMPENSATOR

CROSS-REFERENCE TO RELATED APPLICATIONS

The present application is a continuation of pending International patent application PCT/EP2009/052683 filed on Mar. 6, 2009 which designates the United States and the content of which is incorporated herein by reference.

FIELD OF THE INVENTION

The invention relates to the field of reactive power compensation, and in particular control of reactive power compensators.

BACKGROUND OF THE INVENTION

As modern society relies heavily on a dependable power supply, faults occurring in an electric power network have to be remedied quickly. A single line to ground fault, or single phase to ground fault, wherein one line to ground voltage becomes depressed, is the most frequently occurring short-circuit fault in the electrical power network.

A reactive power compensator, such as a static VAR compensator (SVC) can be used to combat voltage fluctuations. The SVC counteracts voltage drops in the electric power network by providing reactive power and is often able to handle overvoltages by absorbing reactive power. Today, there is a desire to be able to use the SVC for voltage support also during power network faults, and not only during steady state and voltage recovery after fault clearance.

SUMMARY OF THE INVENTION

At the single phase to ground fault, the SVC provides equal susceptance from all its phases, so called symmetrical control. This may result in still low voltage in the faulted phases and possibly excessive voltages in the non-faulted phases as they also obtain a reactive power injection without needing it. Such overvoltages may cause damage to network devices and should obviously be avoided if possible.

In view of the above, it would be desirable to provide means for ensuring that undervoltages of faulted phases are remedied, and also to avoid excessive voltages caused by symmetrical control of the SVC during unsymmetrical power network faults, such as single phase to ground faults.

It is an object of the invention to provide means for improving the performance of a reactive power compensator during single phase to ground faults in an electric power network.

It is another object of the invention to provide means for avoiding excessive voltages during unsymmetrical faults in an electric power network, such as single phase to ground faults.

These objects, among others, are achieved by a poly-phase reactive power compensator as claimed in the independent claim.

In accordance with the invention a poly-phase reactive power compensator is provided for providing reactive power to an electric power network. The poly-phase reactive power compensator comprises for each phase a reactive power means for varying its susceptance. The poly-phase reactive power compensator is characterized by means for transferring susceptance between the reactive power means and thereby between the phases. The invention provides a way of boosting SVC output during unsymmetrical fault conditions.

In accordance with an embodiment of the invention, the means for transferring susceptance comprises a thyristor switch arrangement, which in turn comprises thyristor switches. A simple, yet reliable and very fast arrangement for accomplishing the power transfer is provided.

In accordance with another embodiment of the invention, the susceptance means comprises thyristor-switched capacitors, each thyristor-switched capacitor in turn comprising a capacitor bank and inductor in series connection with a thyristor switch. By means of this feature, transfer of thyristor-switched capacitors phases from non-faulted phases to faulted phase is enabled. An optimized use of available components is thus used, in that the thyristor-switched capacitors, which would in most cases not be used for the non-faulted phases during an unsymmetrical fault, are utilized. If the thyristor-switched capacitors of the prior art solution are utilized, they would all provide equal output, which would still result in under-voltages of the faulted phase, and in excessive voltages in the non-faulted phases. The invention thus enables a way of ensuring that under-voltages of the faulted phase are remedied by providing a novel unsymmetrical control. Further, the invention also provides a way of preventing excessive voltages.

In still another embodiment of the invention, the means for transferring susceptance comprises a thyristor valve arrangement. The thyristor valve arrangement comprises a set of switches connected so as to enable the transfer of power between the phases. Easily implemented power transfer means is thereby provided.

In yet another embodiment of the invention, the reactive power means comprises thyristor-controlled reactors, wherein each thyristor-controlled reactor comprises an inductor in series connection with a thyristor switch. By means of this feature, large unsymmetrical transient overvoltages can be eliminated or at least mitigated.

In yet another embodiment of the invention, the poly-phase reactive power compensator comprises three phases, and the reactive power means are connected in a delta-connection. The invention can thus be implemented in existing reactive power compensators.

In yet another embodiment of the invention, the poly-phase reactive power compensator further comprises a control device arranged to provide control orders to the thyristor switches in dependence on need of the power network. The control of the means of transferring susceptance between the phases can be implemented in the control device used for controlling the output from the reactive power compensator. Thus, no additional components are required for implementing the invention.

The invention also relates to a control device for controlling a reactive power compensator.

Further features and advantages thereof will become clear upon reading the following description and the drawings.

DETAILED DESCRIPTION OF THE INVENTION

Figure 1:
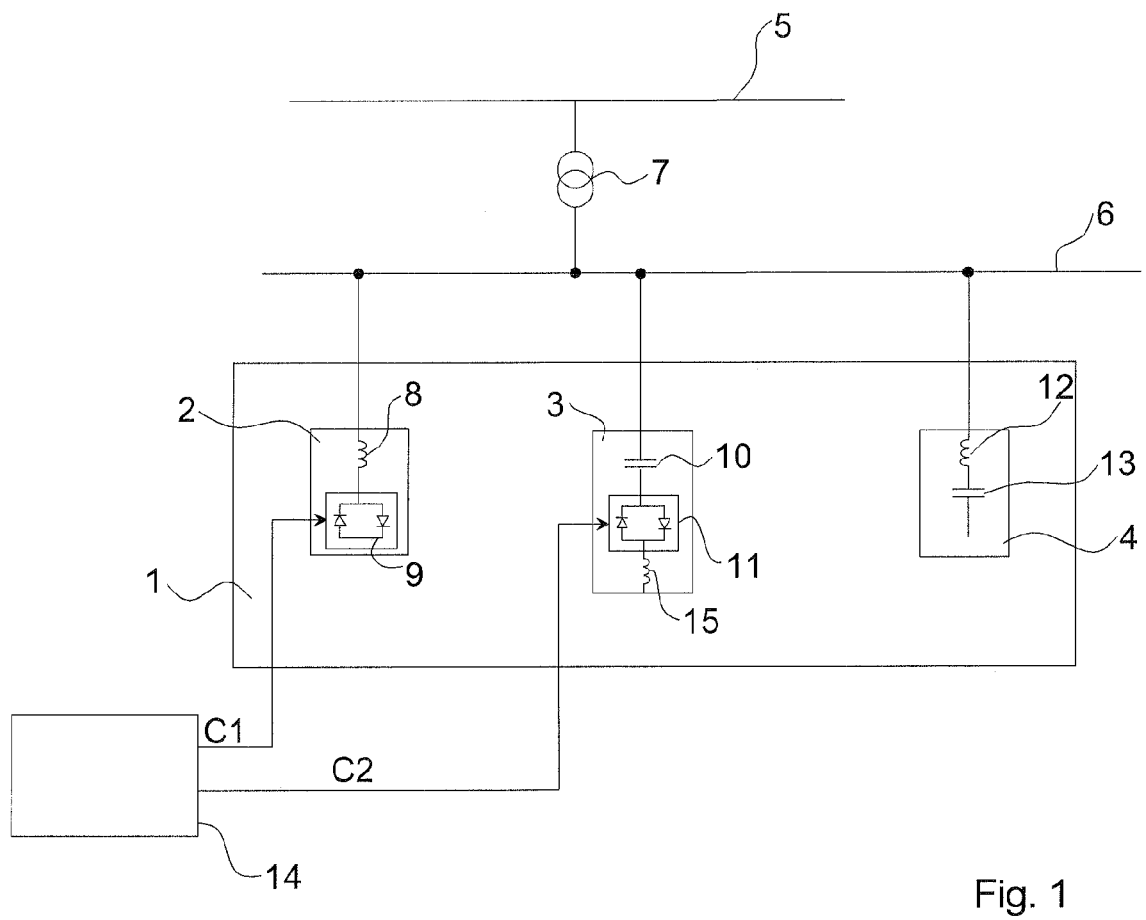
FIG. 1 illustrates an SVC in accordance with the invention.

The same reference numerals are used throughout the figures for denoting the same or corresponding parts.

FIG. 1 illustrates a reactive power compensator in accordance with the invention, the reactive power compensator in the following being exemplified by a static VAR compensator (SVC) 1. The SVC 1 comprises a number of thyristor-controlled reactors 2 (TCR) and a number of thyristor switched capacitors (TSC) 3. The SVC may further comprise one or more filter device(s) 4. The TCR 2, the TSC 3, and the filter device 4 are connected to an electric power network 5, denoted power network in the following, via a medium voltage busbar (MVB) 6 and a transformer 7, both forming part of the SVC 1. The power network 5 may for example be a three-phase electric ac network.

In conventional manner, the TCR 2 comprises an inductor 8 connected in series with a controllable semiconductor device 9. The semiconductor device 9, in the following denoted thyristor switch, comprises two stacks of thyristors in anti-parallel connection. The TSC 3 comprises a current-limiting inductor 15 and a capacitor bank 10 connected in series with a thyristor switch 11. The filter device 4 comprises one or more mutually parallel-connected filters, each filter being tuned to resonance with a certain multiple of the nominal frequency of the power network 5.

A control device 14 is connected to the SVC 1 for controlling the TCR 2 and TSC 3. Voltages on the MVB 6 and in the power network 5 are sensed in conventional manner and supplied to the control device 14. The control device 14 then provides control orders, indicated at C1 and C2, to the TCR 2 and TSC 3 in dependence on the measurements. The control orders C1 and C2 comprises orders to the thyristor switches to be blocked or unblocked, depending on the need for reactive power in the power network 5.

At a single phase to ground fault, there is an under-voltage in the faulted phase, the others may be unaffected, or also have a somewhat low voltage or have high voltage. In accordance with the invention, unsymmetrical control is used for combating the above-described problem. Unsymmetrical control is used today in the sense that a single phase of the SVC may be unblocked while the others are blocked, or that one phase of the SVC is blocked, while the others are not, etc. However, in the unsymmetrical control in accordance with the invention, the surplus susceptance of the non-faulted phases is used to improve the performance of the faulted phase.

In short, in a single-phase fault it is likely that not all the TSCs will be used in all three phases during the power network fault. There will thus be a deficit of susceptance in the faulted phase and surplus in the other phases.

In accordance with the invention, a thyristor valve arrangement is provided, by means of which transfer of TSC phases from the non-faulted phase(s) to the faulted one is enabled.

Figure 2A:
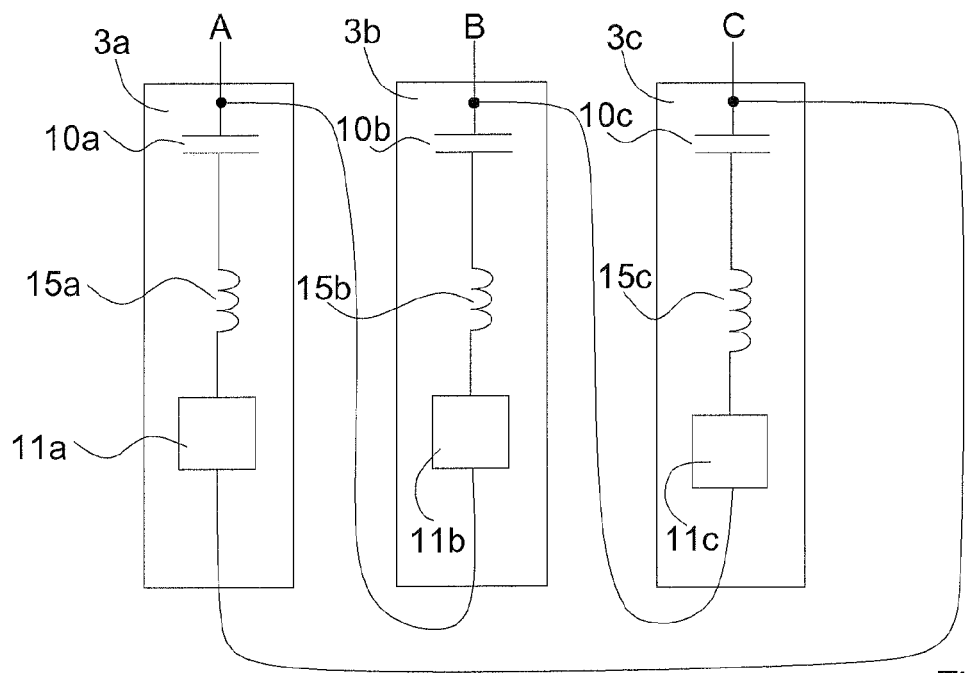
FIG. 2a illustrates a delta-connected TSC arrangement.

FIG. 2a illustrates a conventional three-phase delta arrangement comprising three TSCs 3a, 3b, 3c connected in a delta connection. In particular, each TSC circuit 3a, 3b, 3c comprises one arm of the delta arrangement and is connected between two phases. The illustrated three phases are denoted a, b and c. It is noted that the present invention may be utilized for other types of connections as well, such as Y-connected. However, the invention will be exemplified with the illustrated conventional three-phase delta configured TSCs.

Figure 2B:
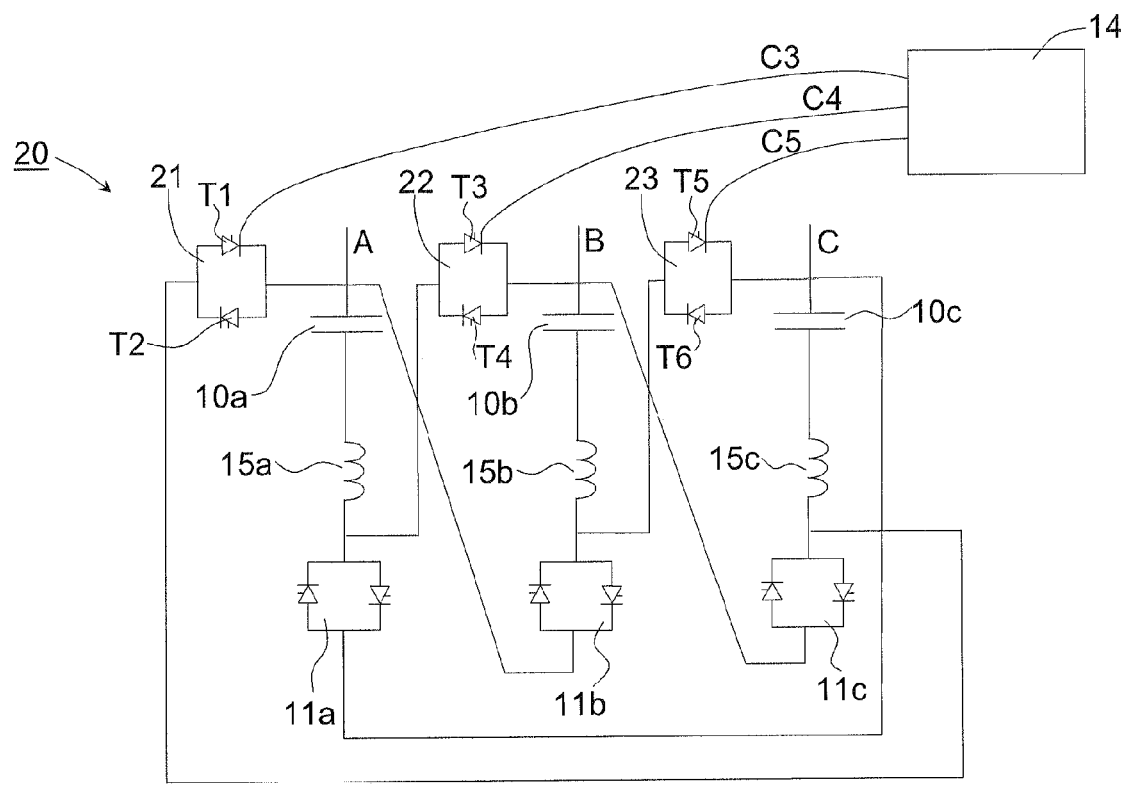
FIG. 2b illustrates a thyristor valve arrangement in accordance with the invention.

FIG. 2b illustrates the thyristor valve arrangement 20 in accordance with the invention, illustrated in the three-phase delta arrangement of FIG. 2a. A thyristor valve or thyristor switch comprises two stacks of thyristors in anti-parallel connection. In accordance with the invention, three such thyristor switches 21, 22, 23 are used for enabling the transfer of TSC phases from the non-faulted phases to the faulted one. Each thyristor switch 21, 22, 23 thus comprises two stacks of thyristors T1, T2; T3, T4; T5, T6.

For the illustrated three-phase delta-connected TSCs 3a, 3b, 3c, the thyristor valve arrangement 20 comprises a first thyristor switch 21 connected at one end to phase a and at the other end between the thyristor switch 11c and reactor 15c of the phase c. Further, a second thyristor switch 22 is connected at one end to phase b and at the other end between the thyristor switch 11a and reactor 15a of the phase a. A third thyristor switch 23 is connected at one end to phase c and at the other end between the thyristor switch 11b and reactor 15b of the phase b.

The control device 14 comprises means for switching off (blocking) and switching on (unblocking) the thyristor switches 21, 22, 23 by transmitting control signals. Such control signals for blocking/unblocking the thyristor switches 21, 22, 23 are illustrated in the FIG. 2b at C3, C4, C5. The control of the thyristor switches 21, 22, 23 can thus be implemented in the control device used for controlling the output from the reactive power compensator and no additional components are required.

If delta phase a-b is faulted, one of the other delta phases b-c, c-a may be connected by means of thyristor switches 21, 22, 23 so as to provide additional reactive power to the faulted phase a. In particular, if all phases are unfaulted, the switches 21, 22, 23 are blocked. If delta phase a-b is faulted the control device 14 transmits an order C4 to turn on switch 22 or an order C5 to turn on switch 23. Similar unblocking (turn-on) orders are transmitted when the respective delta phases a-b, b-c, c-a need additional reactive power.

The invention is applicable to different unsymmetrical faults, such as for example single-phase or two-phase faults. The non-faulted phases are used for transferring susceptance to where it is needed.

Figure 3:
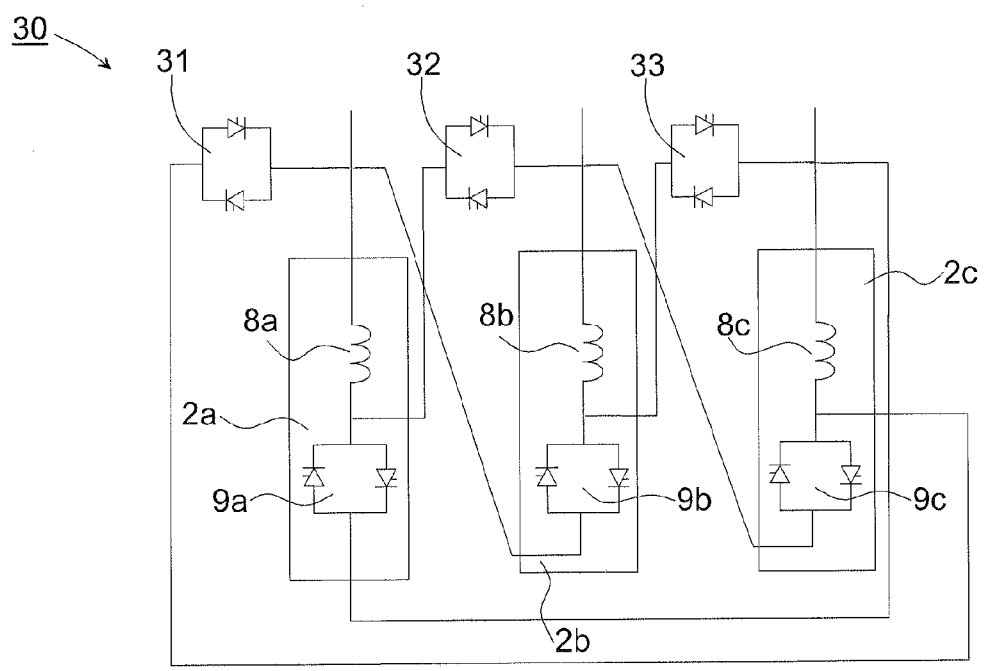
FIG. 3 illustrates the thyristor valve arrangement in accordance with the invention in a second embodiment.

In another embodiment of the invention, illustrated in FIG. 3, the TSCs are replaced with TCRs. A similar thyristor valve arrangement 20 as described above may be utilised for the TCRs 2a, 2b, 2c. Each TCR 2a, 2b, 2c comprises a reactor 8a, 8b, 8c series-connected with a thyristor switch 9a, 9b, 9b, as described with reference to FIG. 1. In a manner corresponding to what is described above, large transient overvoltages can thereby be mitigated by means of the TCRs. That is, reactive power means is transferred between the faulted and non-faulted phases.

In particular, the thyristor valve arrangement 30 comprises a first thyristor switch 31 connected at one end to phase a and at the other end between the thyristor switch 9c and reactor 8c of the phase c. Further, a second thyristor switch 32 is connected at one end to phase b and at the other end between the thyristor switch 9a and reactor 8a of the phase a. A third thyristor switch 33 is connected at one end to phase c and at the other end between the thyristor switch 9b and reactor 8b of the phase b.

In its most general form, the invention thus provides a poly-phase reactive power compensator 1 comprising for each of its phases a-b, b-c, c-a a reactive power generating/absorbing means. The reactive power means comprises the TSCs 3a, 3b, 3c and/or the TCRs 2a, 2b, 2c. The inventive thyristor valve arrangement 20, 30 enables the transfer of reactive power between the phases a-b, b-c, c-a.

The invention also provides a control device 4 for controlling a reactive power compensator 1, comprising means for providing control orders to the means 21, 22, 23; 31, 32, 33 for transferring reactive power between the reactive power means 3a, 3b, 3c; 2a, 2b, 2c. Such means can be implemented in software.

What is claimed is:

1. A poly-phase reactive power compensator for providing susceptance to an electric power network, said poly-phase reactive power compensator comprising for each delta phase a reactive power means for providing varying susceptance, characterized by means for transferring susceptance between said reactive power means and thereby between said phases, wherein said means for transferring susceptance comprises a thyristor valve arrangement, in turn comprising a first thyristor switch connected at one end to a first phase and at the other end between a thyristor switch and reactor, of a third phase, a second thyristor switch connected at one end to a second phase and at the other end between the thyristor switch and reactor of said first phase, and a third thyristor switch connected at one end to said third phase and at the other end between the thyristor switch and reactor of said second phase and, wherein said reactive power means comprises thyristor-switched capacitors, each thyristor-switched capacitor in turn comprising a capacitor bank and inductor in series connection with a thyristor switch.

2. A poly-phase reactive power compensator for providing susceptance to an electric power network, said poly-phase reactive power compensator comprising for each delta phase a reactive power means for providing varying susceptance, characterized by means for transferring susceptance between said reactive power means and thereby between said phases, wherein said means for transferring susceptance comprises a thyristor valve arrangement, in turn comprising a first thyristor switch connected at one end to a first phase and at the other end between a thyristor switch and reactor of a third phase, a second thyristor switch connected at one end to a second phase and at the other end between a thyristor switch and reactor of said first phase, and a third thyristor switch connected at one end to said third phase and at the other end between a thyristor switch and reactor of said second phase and, wherein said reactive power means comprises thyristor-controlled reactors, each thyristor-controlled reactor in turn comprising an inductor in series connection with a thyristor switch.

3. The reactive power compensator as claimed in claim 1, wherein said means for transferring susceptance comprises a thyristor switch arrangement comprising thyristor switches.

4. The reactive power compensator as claimed in claim 1, wherein said poly-phase reactive power compensator comprises three phases, and said reactive power means are connected in a delta-connection.

5. The reactive power compensator as claimed in claim 3, further comprising a control device arranged to provide control orders to said thyristor switches in dependence on need of a power network.

6. A control device for controlling a reactive power compensator as claimed in claim 1, characterized by means for providing control orders to said means for transferring susceptance between said susceptance means and thereby between said phases.

* * * * *